United States Patent
Liao et al.

(10) Patent No.: US 8,308,376 B2
(45) Date of Patent: Nov. 13, 2012

(54) PLUG CONNECTOR HAVING AN IMPROVED SHELL

(75) Inventors: Chi-Nan Liao, Tu-Cheng (TW); Qi-Sheng Zheng, Kunshan (CN); Jia-Yong He, Kunshan (CN)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 260 days.

(21) Appl. No.: 12/781,840

(22) Filed: May 18, 2010

(65) Prior Publication Data

US 2010/0290743 A1    Nov. 18, 2010

(30) Foreign Application Priority Data

May 18, 2009    (CN) .......................... 2009 2 0303263

(51) Int. Cl.
*G02B 6/36* (2006.01)

(52) U.S. Cl. ................. 385/92; 385/88; 385/89

(58) Field of Classification Search ........................ None
See application file for complete search history.

(56) References Cited

U.S. PATENT DOCUMENTS

| | | | |
|---|---|---|---|
| 6,227,880 B1 * | 5/2001 | Zhu et al. ........................ 439/92 |
| 6,390,852 B1 * | 5/2002 | Wang ....................... 439/607.48 |
| 6,508,678 B1 * | 1/2003 | Yang ............................... 439/677 |
| 6,739,904 B2 * | 5/2004 | Wu ................................ 439/497 |
| 6,902,432 B2 * | 6/2005 | Morikawa et al. ....... 439/607.41 |
| 7,021,971 B2 * | 4/2006 | Chou et al. .................... 439/660 |
| 7,104,848 B1 * | 9/2006 | Chou et al. .................... 439/660 |
| 7,258,565 B2 * | 8/2007 | Huang et al. .................. 439/353 |
| 7,422,488 B1 | 9/2008 | Wu |
| 7,534,141 B1 * | 5/2009 | Wu .......................... 439/607.01 |
| 7,572,071 B1 * | 8/2009 | Wu ................................ 385/94 |
| 7,618,293 B2 * | 11/2009 | Wu ................................ 439/660 |
| 7,717,733 B1 * | 5/2010 | Yi et al. ......................... 439/452 |
| 7,744,426 B2 * | 6/2010 | Zheng et al. .................. 439/660 |
| 7,815,460 B2 * | 10/2010 | Lin ................................ 439/358 |
| 7,883,371 B1 * | 2/2011 | Chen et al. ............... 439/607.41 |
| 8,070,517 B2 * | 12/2011 | Xiong et al. ............. 439/607.28 |
| 2004/0067680 A1 * | 4/2004 | Wu ................................ 439/497 |
| 2006/0025015 A1 * | 2/2006 | Hu et al. ........................ 439/607 |
| 2008/0279510 A1 * | 11/2008 | Chan ............................... 385/89 |
| 2009/0117784 A1 * | 5/2009 | Wu ................................ 439/660 |
| 2009/0117785 A1 * | 5/2009 | Wu ................................ 439/668 |
| 2010/0080519 A1 * | 4/2010 | Ko et al. ......................... 385/93 |
| 2010/0124395 A1 * | 5/2010 | Lin et al. ......................... 385/76 |
| 2010/0290743 A1 * | 11/2010 | Liao et al. ....................... 385/75 |
| 2010/0322566 A1 * | 12/2010 | Zheng et al. .................... 385/74 |
| 2011/0065308 A1 * | 3/2011 | Lu et al. ......................... 439/449 |
| 2011/0142399 A1 * | 6/2011 | Little et al. ..................... 385/76 |
| 2011/0256756 A1 * | 10/2011 | Lu et al. ......................... 439/449 |

FOREIGN PATENT DOCUMENTS

WO    2008121731    10/2008

* cited by examiner

*Primary Examiner* — Rhonda Peace
(74) *Attorney, Agent, or Firm* — Wei Te Chung; Ming Chieh Chang

(57) ABSTRACT

A plug connector (10) for mating with a receptacle connector (200) includes an insulative housing (1) having a base portion (11) and a tongue portion (12) extending forwardly beyond the base portion; a set of contacts (2) having contacting portions (211, 221) attached to the tongue portion for mating with the receptacle connector; and a metal shell (7) having a chamber (79) with the tongue portion extending therein, a plurality of openings (74) formed thereon for being locked in by a plurality of resilient fingers (2051) of the receptacle connector, and a set of embossments (76) located at front of the openings and protruding outwardly of the metal shell for interferentially engaging with the resilient fingers (2051).

11 Claims, 7 Drawing Sheets

PLUG CONNECTOR HAVING AN IMPROVED SHELL

BACKGROUND OF THE INVENTION

1. Field of the Invention

The present invention relates to a plug connector, and more particularly to a plug connector having an improved shell.

2. Description of Related Art

A conventional plug connector usually comprises an insulative housing defining a base portion and a tongue portion extending forwardly from the base portion, a plurality of contacts retained in the base portion and extending in the tongue portion for mating with a receptacle connector, and a metal shell shielding the insulative housing and defining a chamber with the tongue portion extending therein. The metal shell has a plurality of openings formed thereon and communicating with the chamber. The receptacle connector has a plurality of resilient fingers latched within the openings. Therefore, the plug connector and the receptacle connector will combine with each other reliably.

However, the resilient fingers of the receptacle connector will be deflected with the increase of insertion times of the plug connector and will loose out from the openings easily, the plug connector could not be retained in the receptacle connector firmly.

Hence, an improved plug connector is desired to overcome the above problems.

BRIEF SUMMARY OF THE INVENTION

According to one aspect of the present invention, a plug connector for mating with a receptacle connector comprises an insulative housing having a base portion and a tongue portion extending forwardly beyond the base portion; a plurality of contacts defining contacting portions attached to the tongue portion for mating with the receptacle connector; and a metal shell defining a chamber with the tongue portion extending therein, a plurality of openings formed thereon for being locked in by a plurality of resilient fingers of the receptacle connector, and a plurality of embossments located at front of the openings and protruding outwardly of the metal shell for interferentially engaging with the resilient fingers.

According to another aspect of the present invention, a connector assembly comprises a receptacle connector and a plug connector adapted to be coupled with each other, the receptacle connector comprising: a metal shield having a receiving room for receiving the plug connector, and a plurality of resilient fingers each defining a convex portion protruding inwardly into the receiving room; and a plurality of terminals extending into the receiving room for mating with the plug connector; the plug connector comprising: an insulative housing having a base portion and a tongue portion extending forwardly beyond the base portion; a plurality of contacts defining contacting portions attached to the tongue portion for mating with the terminals; and a metal shell defining a chamber with the tongue portion extending therein, a plurality of openings formed thereon for being latched in by the convex portions of the resilient fingers, and a plurality of embossments outwardly stamped from the metal shell and located at front of the openings for abutting against the convex portions backwardly.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
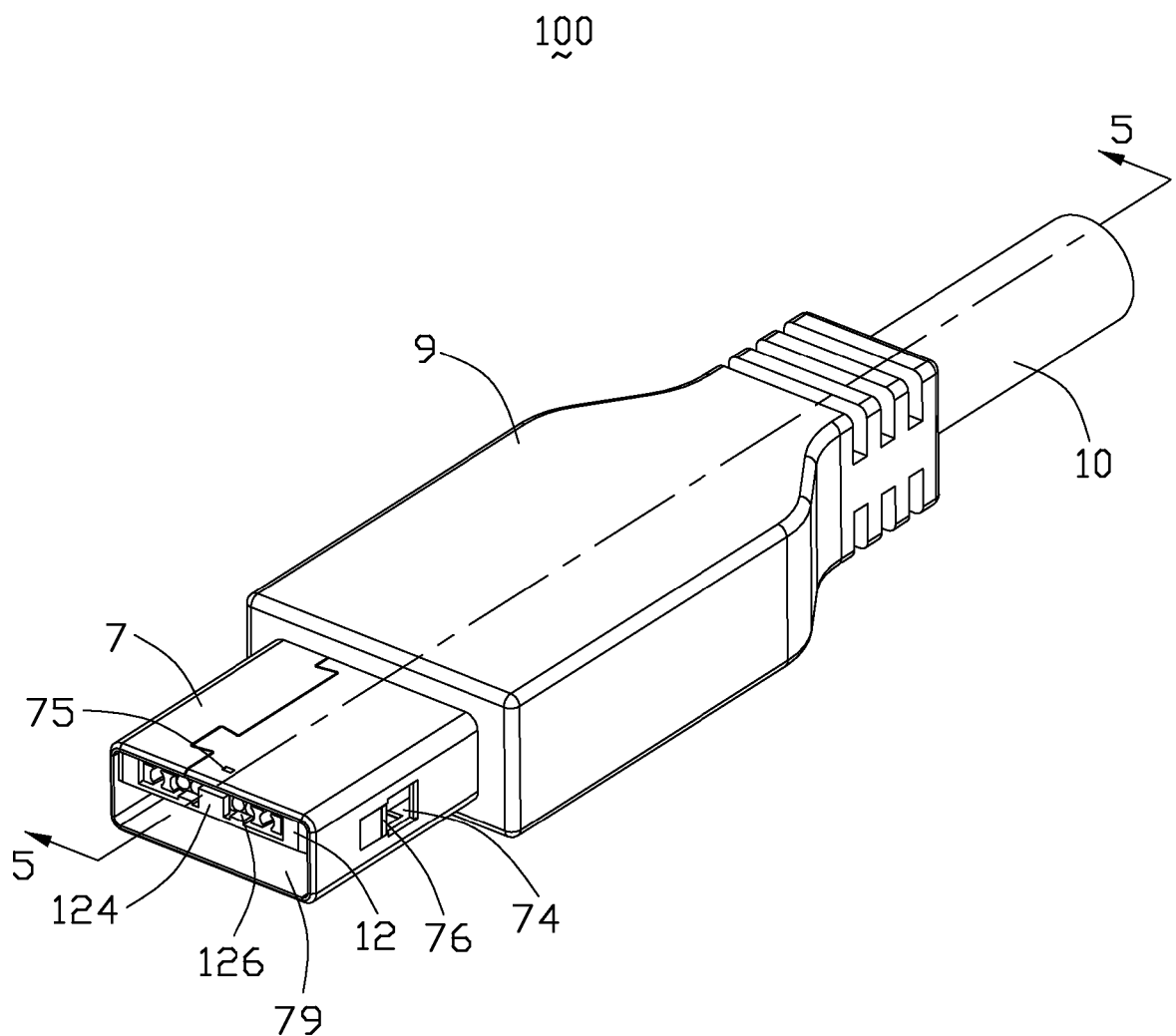
FIG. 1 is an assembled, perspective view of a plug connector of the present invention.
Figure 2:
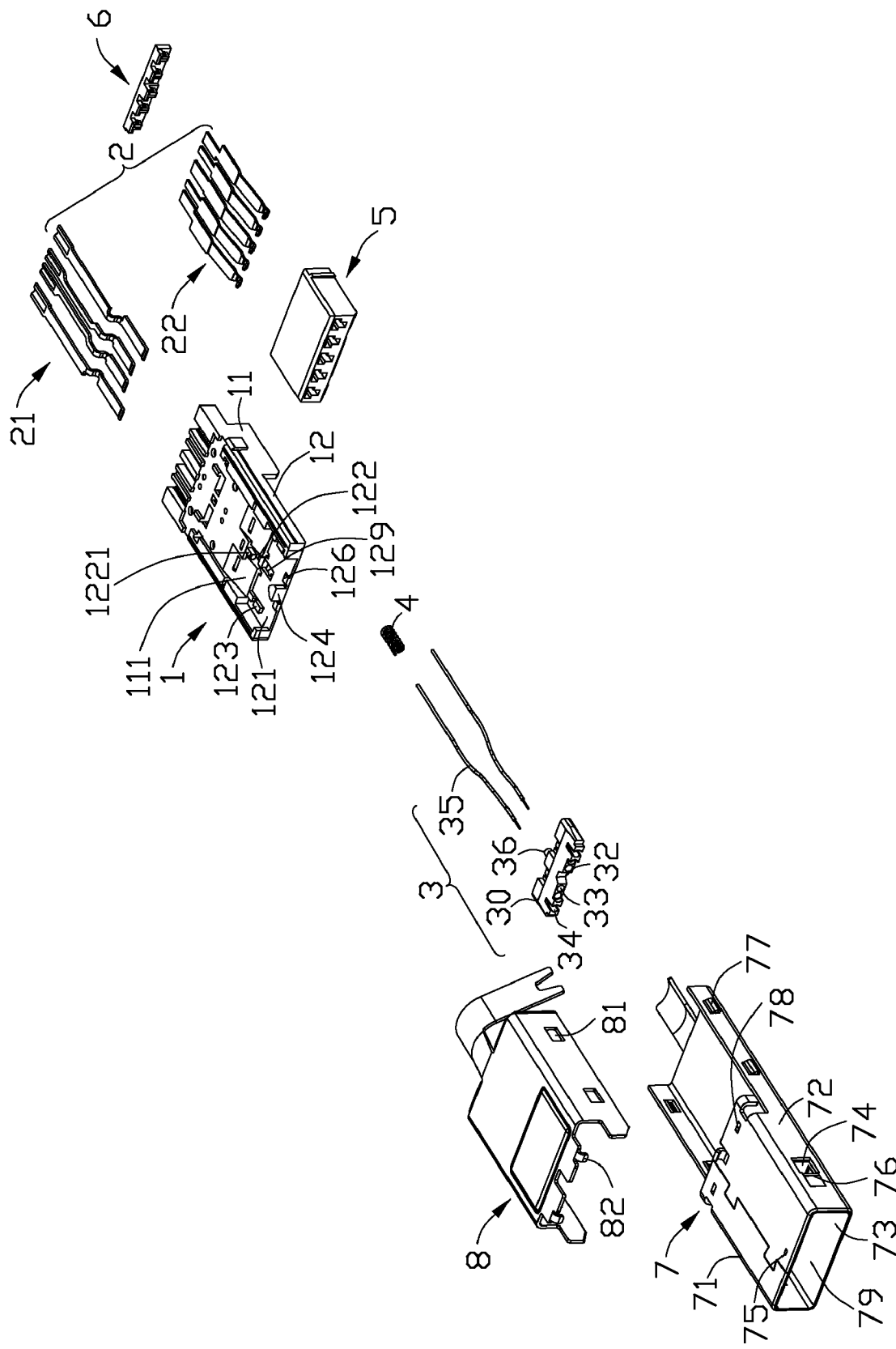
FIG. 2 is an exploded perspective view of the plug connector shown in FIG. 1.
Figure 3:
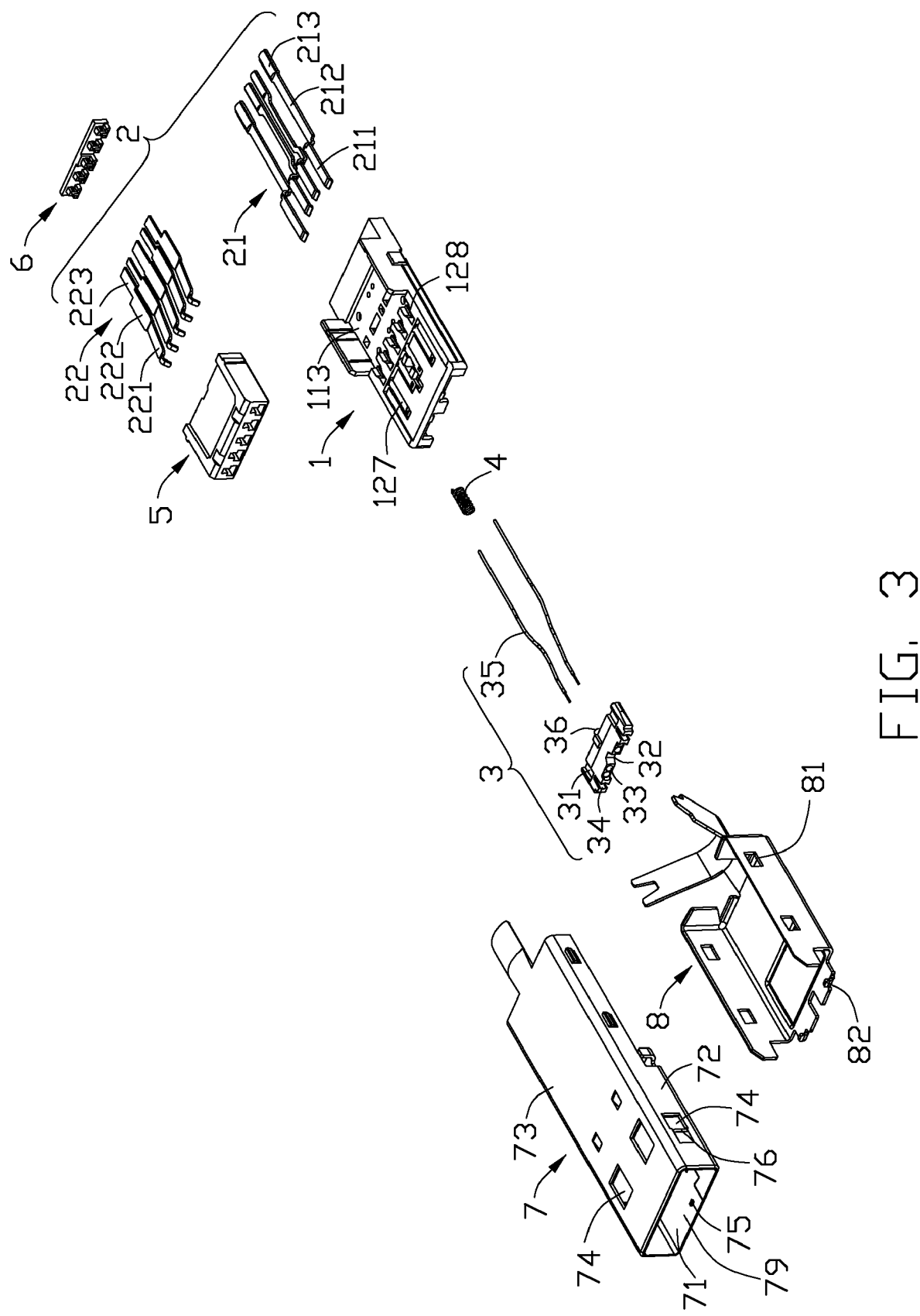
FIG. 3 is similar to FIG. 2, but viewed from another aspect.
Figure 4:
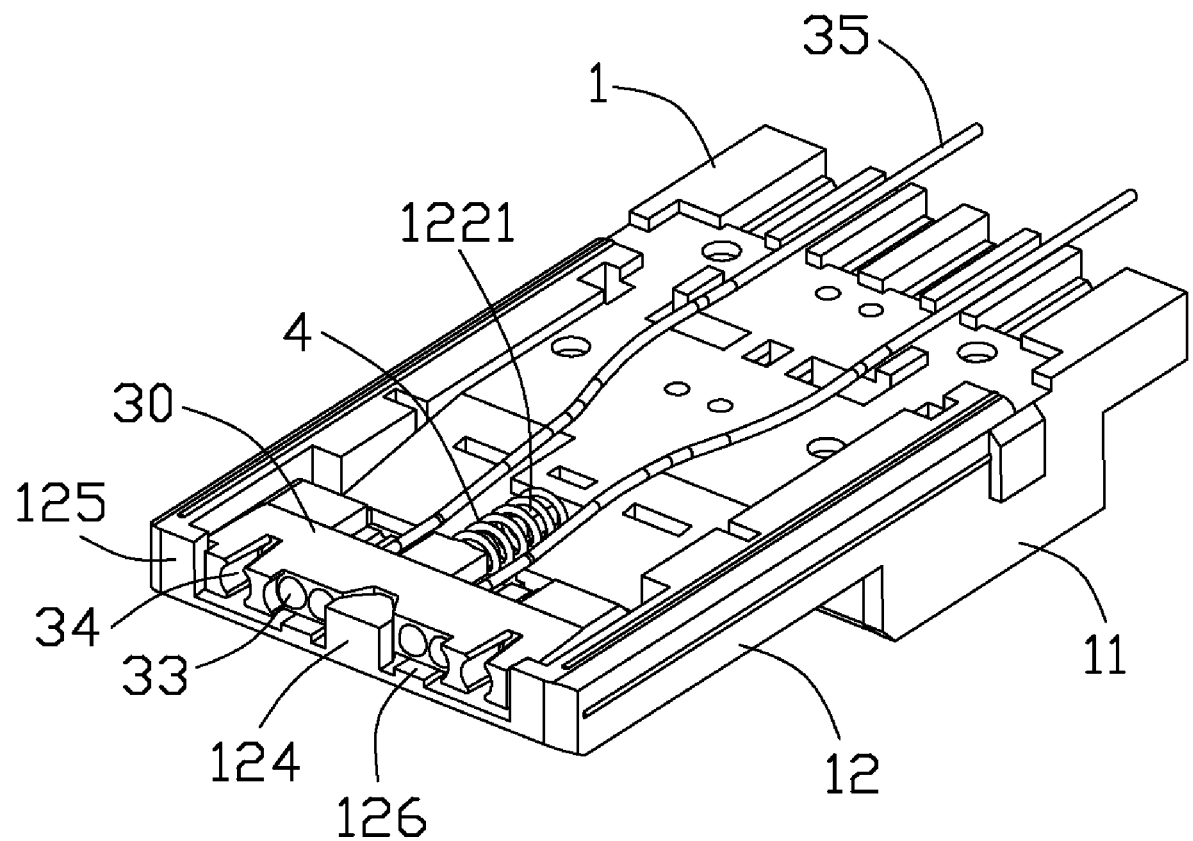
FIG. 4 is a partially assembly view of the plug connector shown in FIG. 1.
Figure 5:
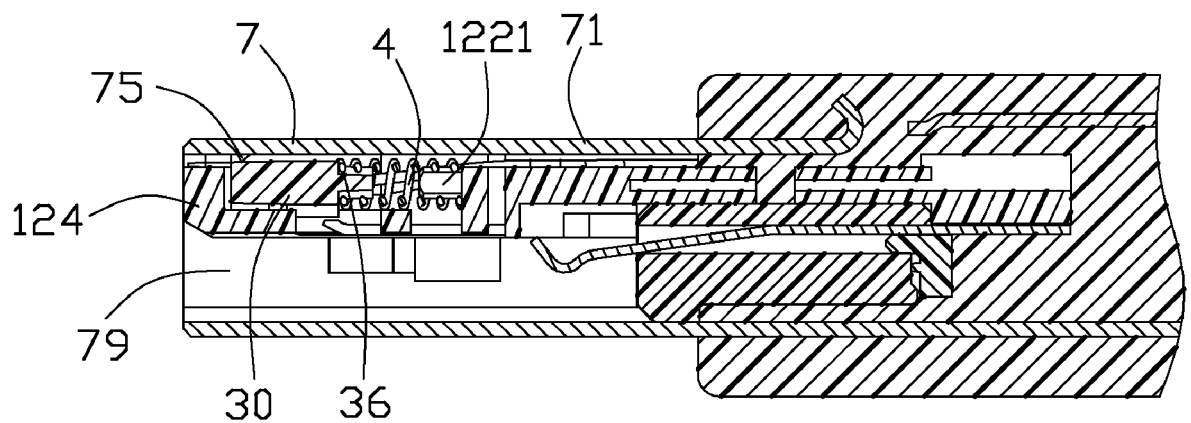
FIG. 5 is a cross-sectional view of the plug connector taken along line 5-5 shown in FIG. 1.

Referring to FIGS. 1-3, A plug connector 100 according to the present comprises an insulative housing 1, a set of contacts 2 attached to the insulative housing 1, an optical module 3 for transmitting optical data and being coupled to the insulative housing 1, a resilient member 4 for urging the optical module 3 moving forwardly, a spacer 5 retained in the insulative housing 1, an insulator 6 for engaging with the spacer 5, a first metal shell 7 and a second metal shell 8 shielding the insulative housing 1, a plastic case 9 surrounding the first and second metal shell 7, 8, and a cable 10 for electrical connection to the contacts 2. In this embodiment, the resilient member 4 is a compression coil spring 4, in other embodiments, the resilient member 4 could be one or two torsion coil springs or resilient metal pieces.

Figure 6:
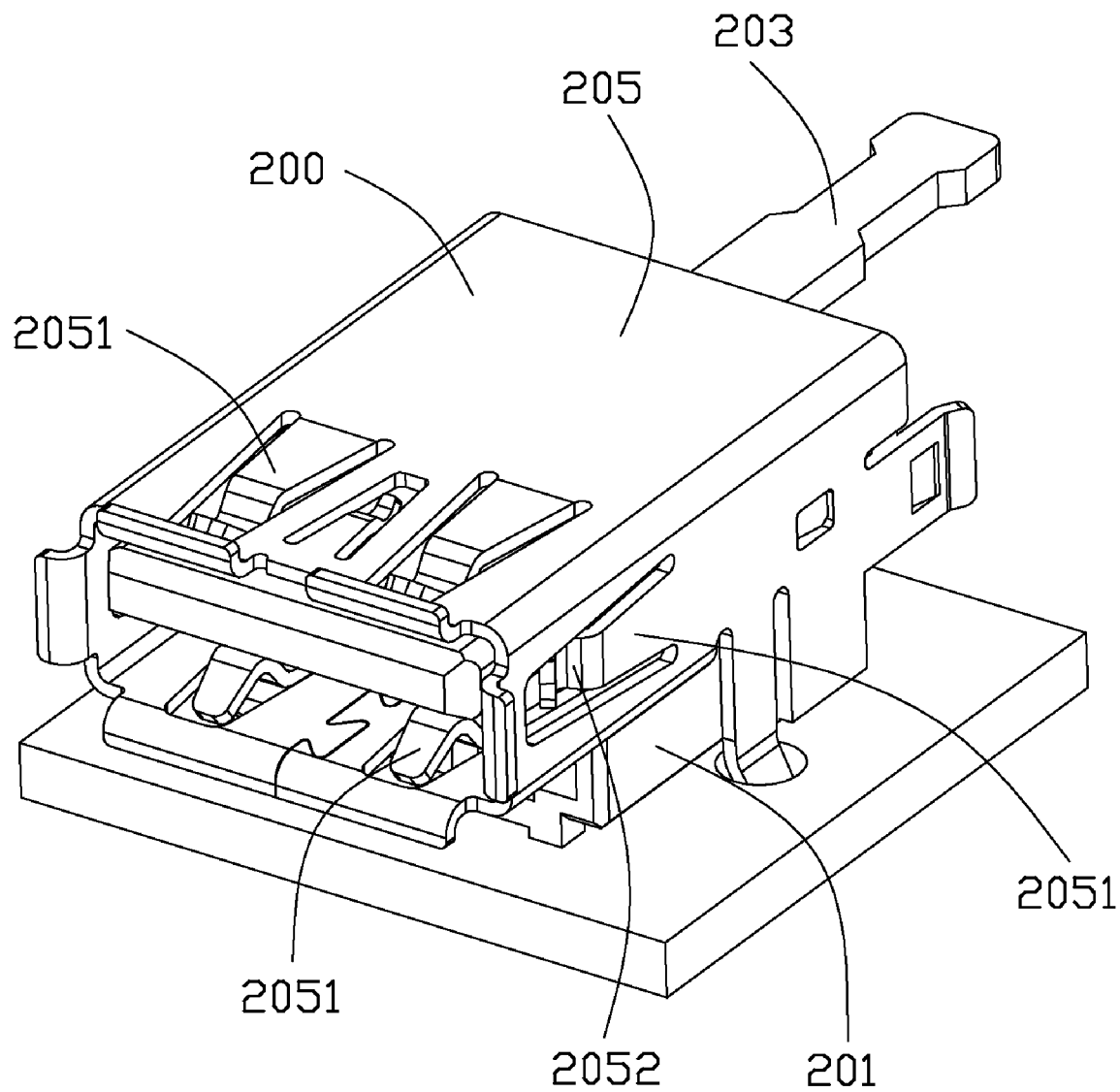
FIG. 6 is an assembled, perspective view of a receptacle connector for mating with the plug connector shown in FIG. 1.
Figure 7:
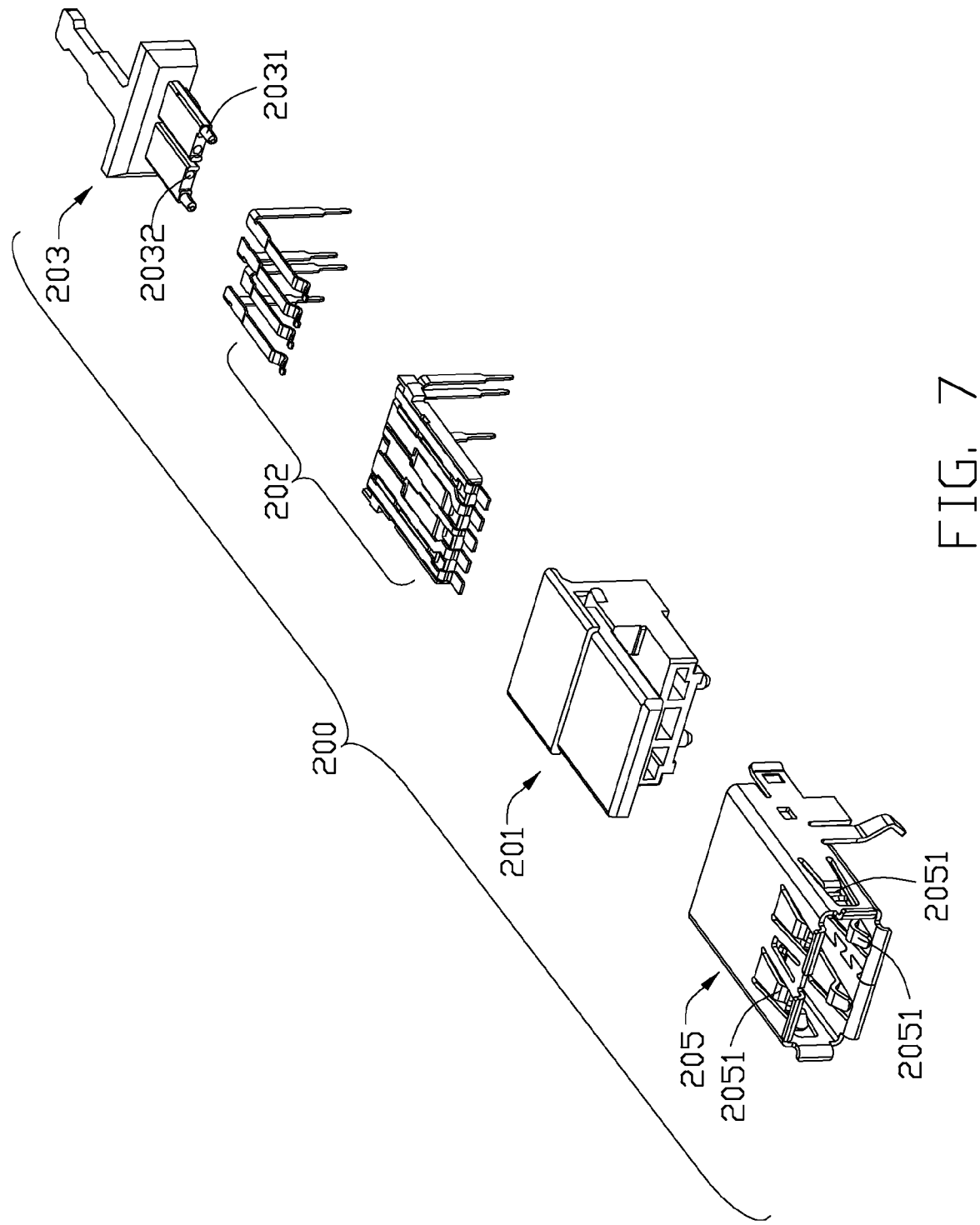
FIG. 7 is an exploded perspective view of the receptacle connector shown in FIG. 6.

Referring to FIGS. 6 and 7, a receptacle connector 200 for mating with the plug connector 100 comprises an insulator 201, a set of terminals 202 retained in the insulator 201, an optical module 203 coupled to the insulator 201 and a metal shield 205 shielding the insulator 201.

Referring to FIG. 1-5, The insulative housing 1 includes a base portion 11 and a tongue portion 12 extending forwardly from a front end of the base portion 11. The insulative housing 1 has a pair of fiber grooves 111 formed on an upper surface thereof and extending on the tongue portion 12 and the base portion 11. The base portion 11 has a depression 113 recessed upwardly from a lower surface thereof for retaining the spacer 5. The tongue portion 12 has a receiving slot 121 recessed downwardly from an upper surface thereof, a cavity 122 at back of the receiving slot 121 and communicating with the receiving slot 121 for receiving the compression coil spring 4, and a post 1221 extending forwardly into the receiving slot 121 for retaining a rear end of the compression coil spring 4. A pair of blocks 123 are formed on the tongue portion 12 and extend in the receiving slot 121. The tongue portion 12 has a reception groove 129 being located under the receiving slot 121 and communicating with the receiving slot 121. The tongue portion 12 has a V-shaped first stopping portion 124 located at front and midst of the receiving slot 121, a pair of second stopping portions 125 located at front and two sides of the receiving slot 121, and a pair of protrusions 126 formed at two lateral sides of the first stopping portion 124 and between the second stopping portions 125. The V-shaped first stopping portion 124 gradually reduces from a widest front end to a narrowest back end. The protrusion 126 protrudes upwardly into the receiving slot 121. A set of first passageways 127 and a set of second passageways 128 are formed at a lower surface of the tongue portion 12 in a condition that the first passageways 127 are arranged in a front row along a transverse direction and the second passageways 128 are arranged in a back row parallel to the front row.

Referring to FIGS. 2 to 3, the contacts 2 are adapted for USB 3.0 protocol, and include a number of first contacts 21 and a number of second contacts 22. The first contacts 21 are adapted for USB 2.0 protocol and each includes a stiff first contacting portion 211 retained in the first passageway 127, a first tail portion 213 for electrical connection to the cable 10, and a first connecting portion 212 connecting the first contacting portion 211 and the first tail portion 213 and being retained in the base portion 11. The second contacts 22 include two pair of differential contacts and a grounding contact located between the two pair of differential contacts. Each second contact 22 includes a resilient second contacting portion 221 received in the second passageway 128, a second tail portion 223 for electrical connection to the cable 10, and a second connecting portion 222 connecting the second contacting portion 221 and the second tail portion 223 and being retained in the spacer 5. The insulator 6 is retained in the spacer 5 to retain the second contacts 22 in the spacer 5 firmly. In this embodiment, the first contacts 21 are assembled to the insulative housing 1, the second contacts 22 are assembled to the spacer 5 and form as a module so as to be assembled to the insulative housing 1, in other embodiments, the first contacts 21 could be insert molded into the insulative housing 1, the second contacts 22 could be insert molded with the spacer 5 and form as a module so as to be assembled to the insulative housing 1.

Referring to FIGS. 1-5, the optical module 3 comprises a main body 30 being movably received in the receiving slot 121 along a front-to-back direction which is perpendicular to the transverse direction, and a pair of fibers 35 attached to the main body 30 and received in the fiber grooves 111. The main body 30 has a pair of sliding slots 31 formed at a lower surface thereof for sliding on the blocks 123 along the front-to-back direction, a V-shaped slot 32 recessed backwardly from a front face thereof and fitted in with the V-shaped first stopping portion 124, a set of lenses 33 attached to the main body 30 and located at two lateral sides of the V-shaped slot 32 for optically coupling with the fibers 35, and a pair of retaining holes 34 formed thereon and located at two lateral sides of the lenses 33 for accommodating a pair of columniations on a complementary receptacle so as to align the lenses 33 with lenses on the receptacle and transmit optical data therebetween reliably. A pole 36 protrudes backwardly from the main body 30 so as to be received in a front end of the compression coil spring 4. Therefore, the optical module 3 could be biased forwardly by the compression coil spring 4.

Referring to FIGS. 2-5, the first metal shell 7 includes a pair of opposed top wall 71 and bottom wall 73, and a pair of side walls 72 connecting the top wall 71 and the bottom wall 73. The top wall 71, the bottom wall 73, and the side walls 72 form a chamber 79 with the tongue portion 12 extending therein. The top wall 71 covers the receiving slot 121 and the cavity, and has a projection 75 projecting downwardly therefrom for abutting against the main body 30 downwardly to retain the main body 30 in the receiving slot 121. The top wall 71 has a pair of retaining slots 78 for being latched by a pair of retaining tabs 82 of the second metal shell 8. The bottom wall 73 has a pair openings 74 passing therethrough and communicating with the chamber 79. Each side wall 72 has a pair of latching tabs 77 for latching in latching slots 81 of the second metal shell 8, an opening 74 passing therethrough and communicating with the chamber 79, and a embossment 76 located at front of the opening 74. The embossment 76 is stamped from the side wall 72 and extends outwardly from the side wall 72. When the plug connector 100 is inserted into the receptacle connector 200, the metal shield 205 of the receptacle connector 200 has a plurality of resilient fingers 2051 formed on an upper side, a lower side and two lateral sides and defining convex portions 2052 protruding inwardly for latching within the openings 74 of the first metal shell 7, the embossments 76 of the first metal shell 7 will have an interferential engagement with the resilient fingers 2051 to retain the convex portions 2052 in the openings 74 firmly, therefore, the plug connector 100 and the receptacle connector 200 will combine with each other reliably. In other embodiments, the embossments 76 could be stamped from the bottom wall 73 and locate at front of the openings 74 so as to have an interferential engagement with the resilient fingers 2051 on the lower side.

When the plug connector 100 is inserted into the complementary receptacle for mating with the receptacle, the optical module 3 is pushed backwardly by the receptacle and moves backwardly in the receiving slot 121. Because the rear end of the compression coil spring 4 is retained in the post 1221 of the insulative housing 1, when the lenses 33 and lenses 2032 on the receptacle 200 are misaligned, the optical module 3 will vibrate in a height direction to make the lenses 33 align with the lenses 2032 on the receptacle 200 and transmit optical data therebetween reliably, the reception groove 129 will offer a space for the optical module 3 vibrating in the height direction. When the plug connector 100 is extracted out from the complementary receptacle, the optical module 3 is biased forwardly by the compression coil spring 4 and moves forwardly in the receiving slot 121, the V-shaped first stopping portion 124 fits in with the V-shaped slot 32 for resisting the optical module 3 backwardly and sidewardly so as to prevent the optical module 3 moving in the front-to-back and transverse direction, the second stopping portions 125 abut against the front face of the main body 30 to prevent the optical module 3 moving forwardly, the projection 75 abuts against the main body 30 downwardly and the protrusions 126 abut against the main body 30 upwardly so as to retain the optical module 3 therebetween. Therefore, the first stopping portion 124 and the second stopping portions 125 present as a stopping device for orientating the optical module 3 in the front-to-back and the transverse direction, the protrusions 126 and the projection 75 present as a resisting device for orientating the optical module 3 in a height direction of the plug connector 100, the optical module 3 will be orientated on its original position firmly and accurately, and the optical data will be transmitted between the plug connector and the receptacle reliably.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A plug connector for mating with a receptacle connector comprising:
    an insulative housing having a base portion and a tongue portion extending forwardly beyond the base portion;
    a plurality of contacts defining contacting portions attached to the tongue portion for mating with the receptacle connector; and
    a metal shell defining a chamber with the tongue portion extending therein, a plurality of openings formed thereon for being locked in by a plurality of resilient fingers of the receptacle connector, and a plurality of embossments located at front of the openings and protruding outwardly of the metal shell for interferentially engaging with the resilient fingers; wherein
    the metal shell has a top wall covering an upper surface of the tongue portion, a bottom wall opposite to the top wall, and a pair of side walls connecting the top wall and the bottom wall, the openings are formed on the side walls, the embossments are integrally stamped outwardly from the side walls.

2. The plug connector according to claim 1, wherein the tongue portion has a receiving slot recessed downwardly from the upper surface thereof and covered by the top wall, the plug connector comprises an optical module for optically mating with the receptacle in a front-to-back direction and being movably received in the receiving slot along the front-to-back direction, and a resilient member for urging the optical module moving forwardly in the receiving slot.

3. The plug connector according to claim 2, wherein the tongue portion has a V-shaped first stopping portion extending upwardly therefrom and being located at front of the receiving slot, the V-shaped first stopping portion gradually reduces from a widest front end to a narrowest back end, the optical module has a V-shaped slot recessed backwardly from a front surface thereof for accordantly accommodating the V-shaped first stopping portion.

4. The plug connector according to claim 2, wherein the tongue portion has a pair of protrusions protruding upwardly towards the receiving slot and located at front of the receiving slot for abutting against a lower surface of the optical module upwardly.

5. The plug connector according to claim 4, wherein the top wall has a projection projecting downwardly therefrom for abutting against an upper surface of the optical module downwardly, the optical module is sandwiched between the projection and protrusions in a height direction of the tongue portion.

6. The plug connector according to claim 2, wherein the optical module comprises a main body for being movably received in the receiving slot, a plurality of lenses attached to the main body, and a plurality of fibers for optically coupling with the lenses.

7. A connector assembly comprising:
    a receptacle connector and a plug connector adapted to be coupled with each other,
    the receptacle connector comprising:
    a metal shield having a receiving room for receiving the plug connector, and a plurality of resilient fingers each defining a convex portion protruding inwardly into the receiving room;
    and a plurality of terminals extending into the receiving room for mating with the plug connector;
    the plug connector comprising:
    an insulative housing having a base portion and a tongue portion extending forwardly beyond the base portion;
    a plurality of contacts defining contacting portions attached to the tongue portion for mating with the terminals; and
    a metal shell defining a chamber with the tongue portion extending therein, a plurality of openings formed thereon for being latched in by the convex portions of the resilient fingers, and a plurality of embossments outwardly stamped from the metal shell and located at front of the openings for abutting against the convex portions backwardly; wherein
    the metal shell has a top wall covering an upper surface of the tongue portion, a bottom wall opposite to the top wall, and a pair of side walls connecting the top wall and the bottom wall, the openings are formed on the side walls and communicate with the chamber, the embossments are integrally stamped outwardly from the side walls.

8. The connector assembly according to claim 7, wherein the tongue portion has a receiving slot recessed downwardly from the upper surface thereof and covered by the top wall, the plug connector comprises an optical module for optically mating with an optical device of the receptacle in a front-to-back direction and being movably received in the receiving slot along the front-to-back direction, and a resilient member for urging the optical module moving forwardly in the receiving slot.

9. The connector assembly according to claim 8, wherein the tongue portion has a pair of protrusions protruding upwardly towards the receiving slot and located at front of the receiving slot for abutting against a lower surface of the optical module upwardly, the top wall has a projection projecting downwardly therefrom for abutting against an upper surface of the optical module downwardly, the optical module is sandwiched between the projection and the protrusions to be orientated in a height direction of the tongue portion.

10. The connector assembly according to claim 8, wherein the tongue portion has a V-shaped first stopping portion extending upwardly therefrom and being located at front of the receiving slot, the V-shaped first stopping portion gradually reduces from a widest front end to a narrowest back end and is received in a V-shaped slot of the optical module for orientating the optical module in both a front-to-back direction and a transverse direction perpendicular to the front-to-back direction.

11. An electrical connector comprising:
    a receptacle connector for mounting to a printed circuit board, including:
    an insulative receptacle housing defining a mating tongue with a plurality of receptacle contacts thereon;
    a metallic receptacle shell attached to the receptacle housing with a rectangular frame structure surrounding said mating tongue, said frame structure defining two opposite large side walls and two opposite secondary small walls, a plurality of resilient fingers unitarily stamped from the corresponding side walls inwardly toward the mating tongue, wherein an amount of the resilient fingers on each of said large side walls is greater than that on each of the small side walls;

a plug connector for mating with the receptacle connector, including:

an insulative plug housing with a plurality of plug contacts therein;

a metallic plug shell attached to the plug housing and defining a rectangular frame mechanism cooperating with the plug housing to define a mating portion adapted to be inserted into the rectangular frame structure to mate with the mating tongue; and a plurality of through openings formed in the rectangular frame mechanism of the plug shell for receiving the corresponding resilient fingers of the receptacle connector therein; wherein each of the through openings for receiving the resilient finger on the corresponding small side walls is equipped with a wedged protrusion in a front edge thereof while the through opening for receiving the resilient finger on the corresponding large side wall is not.

* * * * *